(12) United States Patent
Miller

(10) Patent No.: US 7,621,474 B2
(45) Date of Patent: Nov. 24, 2009

(54) METHOD AND APPARATUS FOR CALCINING GYPSUM

(75) Inventor: Dale E. Miller, Beaver, PA (US)

(73) Assignee: National Gypsum Properties, LLC, Charlotte, NC (US)

( * ) Notice: Subject to any disclaimer, the term of this patent is extended or adjusted under 35 U.S.C. 154(b) by 327 days.

(21) Appl. No.: 11/374,689

(22) Filed: Mar. 14, 2006

(65) Prior Publication Data
US 2007/0215020 A1  Sep. 20, 2007

(51) Int. Cl.
*B02C 11/08* (2006.01)
*B02C 21/00* (2006.01)

(52) U.S. Cl. .......................... 241/23; 241/79.1; 241/62

(58) Field of Classification Search .................. 241/23, 241/27, 79.1, 62
See application file for complete search history.

(56) References Cited

U.S. PATENT DOCUMENTS

| | | | |
|---|---|---|---|
| 3,794,251 A | * | 2/1974 | Williams ..................... 241/65 |
| 4,201,595 A | * | 5/1980 | O'Neill ....................... 106/783 |
| 4,947,906 A | * | 8/1990 | Schroeder ................. 144/208.7 |
| 5,184,781 A | * | 2/1993 | Andela ......................... 241/62 |
| 5,238,193 A | * | 8/1993 | Pearce .......................... 241/19 |
| 6,083,465 A | * | 7/2000 | Piasecki et al. ............. 423/171 |
| 6,880,772 B2 | * | 4/2005 | Schlesiger et al. ............ 241/23 |

\* cited by examiner

*Primary Examiner*—Bena Miller
(74) *Attorney, Agent, or Firm*—Ice Miller LLP

(57) ABSTRACT

The subject invention relates generally to methods and apparatuses for calcining gypsum. The apparatuses and methods place a gypsum particle optimizer in close association with the impact mill so that all the gypsum supplied to the impact mill has to enter the gypsum particle optimizer prior to the gypsum entering the impact mill, and so that heat generated from the impact mill enters into the gypsum particle optimizer from the impact mill. The gypsum particle optimizer utilizes a rotor to disperse the gypsum throughout the gypsum particle optimizer so that the gypsum is exposed to the heat from the impact mill prior to entering the impact mill. The exposure to the heat removes free water from the gypsum prior to the gypsum entering the impact mill.

10 Claims, 3 Drawing Sheets

METHOD AND APPARATUS FOR CALCINING GYPSUM

CROSS-REFERENCE TO RELATED APPLICATIONS

This application claims the benefit of U.S. Provisional Application No. 60/326,936, filed Oct. 4, 2001.

BACKGROUND OF INVENTION

The subject invention relates generally to methods and apparatuses for calcining gypsum, and in particular to methods and apparatuses for continuously calcining natural gypsum, synthetic gypsum, or combinations of natural and synthetic gypsum. Calcined gypsum, more commonly known as stucco, is useful as a major ingredient of gypsum wallboard and plaster-based products. Stucco has the valuable property of being chemically reactive with water and will "set" rather quickly when the two are mixed together. It is this quick setting time that makes stucco ideal to work with in the mass production of wallboard.

Typically, wallboard consists essentially of a gypsum core sandwiched between two sheets of paper and is used as a cost-effective replacement of conventional plaster walls. To be commercially profitable, wallboard is typically manufactured by continuous high speed processes. Typically, gypsum (calcium sulfate dihydrate) predominately makes up the wallboard. Manufactures mine and transport gypsum to a board mill in order to dry it, grind it and calcine it to yield stucco (the "milling process"). Drying refers to the removal of the free water from the gypsum (water not bonded to calcium sulfate) and calcination refers to the conversion of calcium sulfate dihydrate to calcium sulfate. The reaction for the creation of stucco is characterized by the following equation:

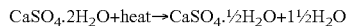

$$CaSO_4 \cdot 2H_2O + \text{heat} \rightarrow CaSO_4 \cdot \tfrac{1}{2}H_2O + 1\tfrac{1}{2}H_2O$$

This equation shows that calcium sulfate dihydrate plus heat yields calcium sulfate hemihydrate (stucco) plus water vapor. This process is normally conducted in a flash calcination impact mill, of which there are several types known in the art. Such an impact mill simultaneously dries, grinds, and calcines the gypsum to produce stucco.

As mentioned above, calcined gypsum (stucco) has the valuable property of being chemically reactive with water, and will "set" rather quickly when the two are mixed together. This setting reaction reverses the above-described stucco chemical reaction performed during the calcination step. The reaction proceeds according to the following equation:

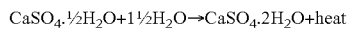

$$CaSO_4 \cdot \tfrac{1}{2}H_2O + 1\tfrac{1}{2}H_2O \rightarrow CaSO_4 \cdot 2H_2O + \text{heat}$$

In this reaction, the calcium sulfate hemihydrate is rehydrated to its dihydrate state over a fairly short period of time. The actual time required for this setting reaction generally depends upon the type of calciner employed and the type of gypsum rock that is used.

In manufacturing wallboard, a "stucco slurry" is formed by mixing together calcium sulfate hemihydrate (stucco) that is produced from the milling process, an accelerator, a retarder, a starch, water, paper pulp, potash, and a water-reducing agent usually in a pin mixer. The stucco slurry is then discharged from the mixer through a chute which spreads the slurry on a moving, continuous bottom sheet of paper, which is slightly wider than the desired board width. A moving, continuous top sheet of paper is placed on the slurry and the bottom paper sheet so that the slurry is positioned in between the top and bottom sheets of paper to form a "wet wallboard." Rollers with guides are used to form the wallboard to the desired thickness and width. The board then travels along rollers for several minutes, during which time the setting reaction occurs and the board stiffens. The boards are then cut into a desired length and then fed into a large, continuous oven/kiln for drying. The end product is a wallboard with a gypsum core.

In the milling process, either natural gypsum or synthetic gypsum can be used to produce the stucco. Synthetic gypsum, also known as by-product gypsum, is typically produced as a by-product in various chemical processes. For example, flue gas desulfurization (FGD) gypsum is a by-product of stack gas scrubbing processes and titanogypsum is produced by neutralizing waste sulfuric acid from the sulfate process used to manufacture titanium oxide pigment. Other examples, including but not limited to, phosphogypsum, fluorogypsum, citrogypsum and borogypsum are well known in the art. Synthetic gypsum typically includes more free water (water not bound to calcium sulfate) than natural gypsum. Natural gypsum typically includes about 1%-3% free water (unless otherwise indicated, percentages herein indicate percent by weight of the composition), compared to synthetic gypsum which is typically mechanically de-watered to contain about 6%-12% free water.

Over time, improvements have been made to the manufacturing process of wallboard that has increased the manufacturing board line speeds to an extent that the milling process cannot provide the board line with enough stucco to continuously produce the wallboard. The inability of the milling process to meet the demand is compounded by the increased use of gypsum that contains over 10% free water to create stucco. As stated above, stucco is produced by drying, grinding and calcining gypsum. In order to obtain the heat required to remove the additional free water from gypsum, the mill inlet temperatures had to be raised. The raised inlet temperatures has led to a reduction of the overall tonnage of gypsum the impact mill can process into stucco. Thus, the overall amount of stucco being manufactured was substantially reduced. This reduction in manufactured stucco coupled with the increase in demand from the board line led to a substantial amount of downtime. Manufacturers need the downtime to build a stucco supply that allows for the board line to continuously manufacture the wallboard. Unfortunately, the downtime leads to increased manufacturing costs and delays the process of making wallboard.

Thus, it would be advantageous to develop a method and apparatus for calcining gypsum that allowed for increased production of stucco. Moreover, it would be advantageous to produce a method and apparatus for calcining gypsum that also helped reduce problems that have always plagued the milling process. For example, it would be advantageous to increase air flow and prevent build up in the feed path (i.e., the area where the gypsum enters into the impact mill).

BRIEF INVENTION SUMMARY

The subject invention relates generally to methods and apparatuses for calcining gypsum. For example, one embodiment of the method for calcining gypsum can utilize at least one impact mill that has at least one heat source that produces heat. The method positions a gypsum particle optimizer in close association with the impact mill so that any gypsum supplied to the impact mill has to enter into the gypsum particle optimizer prior to entering the impact mill. In this position, the heat produced from the burner also enters into the gypsum particle optimizer. In this embodiment, the gypsum particle optimizer has a rotor that is rotated as gypsum enters into the gypsum particle optimizer. The rotating of the rotor as the gypsum enters the gypsum particle optimizer causes the gypsum to be exposed to the heat produced by the burner, prior to the gypsum entering the impact mill. The exposure of the gypsum to this heat removes a portion of the gypsum's free water.

An exemplary embodiment of the apparatus for calcining gypsum utilizes at least one impact mill having a feed chute and at least one heat source that produces heat. A gypsum particle optimizer is connected to the feed chute so that heat produced by the heat source will enter into the gypsum particle optimizer and so that the gypsum supplied to the apparatus will pass through the gypsum particle optimizer prior to entering into the impact mill. The gypsum particle optimizer of this embodiment has a compartment that forms a passageway for the gypsum, the passageway having a rotor positioned therein. The apparatus and method can also have a means, such as weigh belt, that can supply gypsum at a substantially constant rate to the gypsum particle optimizer and impact mill.

An exemplary embodiment of the gypsum particle optimizer has a compartment with a first open end and a second open end. The first open end and the second open end of the compartment are positioned in relation to one another to form a passageway inside the compartment between the first and second open ends. The gypsum particle optimizer has a rotor positioned within the passageway of the compartment so that the rotor can rotate. The gypsum particle optimizer can also comprise at least one chain connected at one end to the rotor. Further, the rotor of each of the exemplary embodiments can be rotated at a rate of about 1200 rpm to about 1800 rpm or any other rate that falls outside of this range. A motor, or any other like means, can be operably connected to the rotor so that during operation the motor will cause the rotor to rotate. Typically, a motor is operably connected to the rotor by a belt. However, any means of operably connecting the motor to the rotor can be used. Moreover, the gypsum particle optimizer of any of these embodiments can be of any size but typically, the gypsum particle optimizer will have a capacity of 22-32 tons.

DETAILED DESCRIPTION OF THE INVENTION

Figure 1:
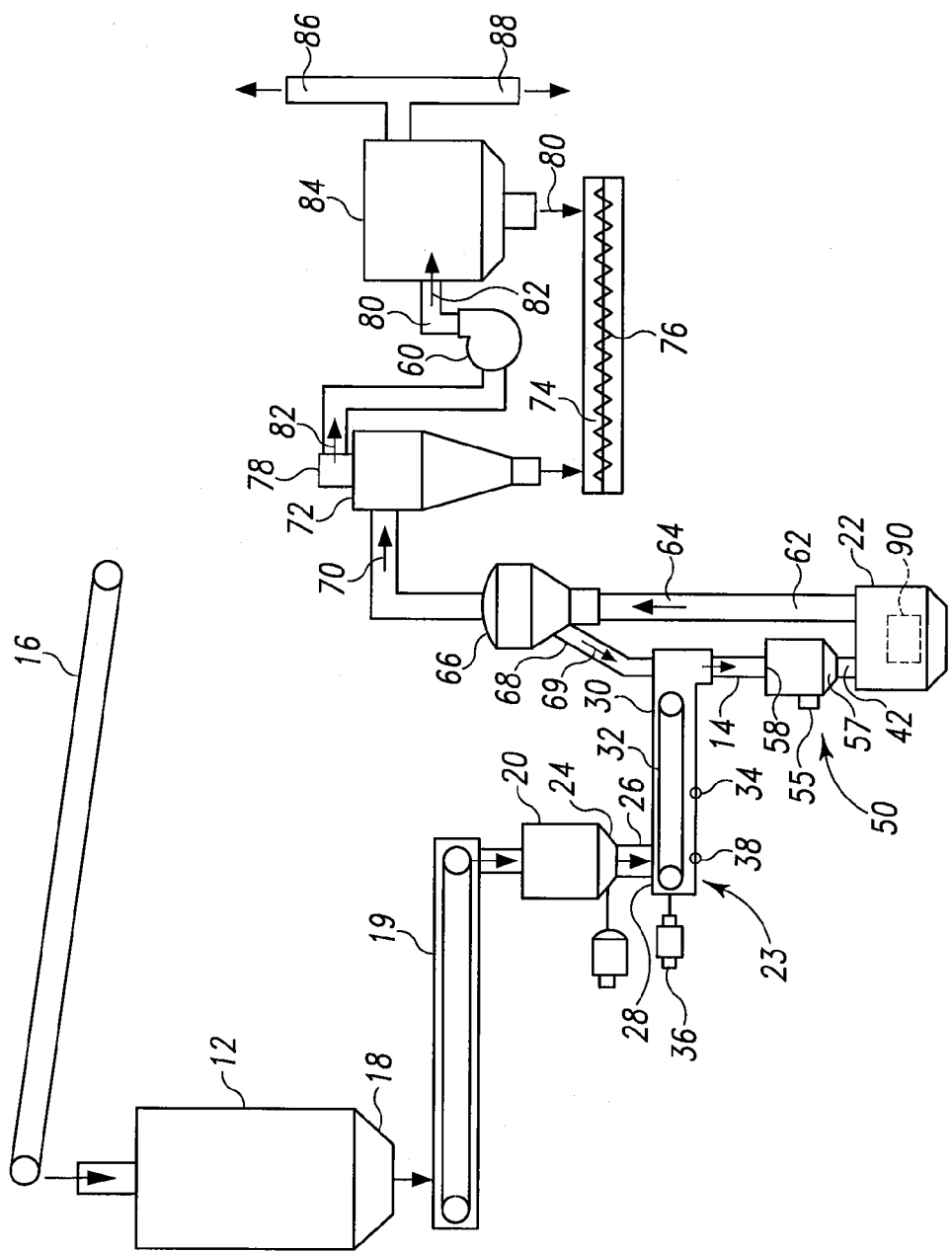
FIG. 1 shows a schematic view of an exemplary embodiment of an apparatus for calcining gypsum.

FIG. 1 shows a schematic view of an exemplary embodiment of the apparatus of the subject invention for calcining gypsum. As shown in FIG. 1, the apparatus or system 10 for calcining gypsum includes a surge silo 12 that stores the gypsum that is waiting to be calcined. The gypsum may include 100% natural gypsum, 100% synthetic gypsum, or any combination of natural and synthetic gypsum. Surge silo 12 can have any type of capacity but typically has a capacity of about 300 tons (about 272 metric tons). Before the gypsum is stored in surge silo 12, the gypsum is crushed in a hammermill (not shown) and then transferred from the hammermill to sure silo 12 by a raw material transfer conveyer 16. The hammermill typically reduces the size of gypsum rocks from a diameter of about 6 inches (about 15 cm) to a diameter of about 2 inches (5.1 cm) or less. Synthetic gypsum does not normally need to be crushed in the hammermill but is typically mechanically de-watered to a free water content of about 6% to about 12% by means well known to those skilled in the art.

After the gypsum conveyer 16 supplies the gypsum to surge silo 12, the gypsum can be removed from the surge silo through a discharger 18, such as a rotary-plow discharger, located at the bottom of the surge silo. Discharger 18 delivers the gypsum to another conveyer 19, which may be, for example, a high angle type conveyer. From conveyer 19, the gypsum can be moved by a chain conveyor (i.e., a drag chain style conveyor with drag bars located at approximately 12-inch intervals, riding in a rectangular-type trough). The troughs of the chain conveyor can be lined with a high-density plastic material, such as ultrahigh molecular weight (UHMW) polyethylene, which prevents the gypsum from sticking and building up on the conveyor. This chain conveyor then supplies one or more feed bins 20 with the gypsum.

While feed bins 20 of any size can be used, normally feed bins 20 have a capacity between about 10 tons and about 15 tons (9.1 metric tons to about 13.6 metric tons) and provide gypsum to a calcination apparatus, which in this embodiment is a flash calcination impact mill 22. For simplicity, FIG. 1 shows only a single feed bin 20 and impact mill 22, although the apparatus 10 can include a plurality of impact mills and normally includes four impact mills, each coupled with a particular feed bin 20. The apparatus also can include recirculation conveyers (not shown) for returning excess gypsum from the feed bins 20 to the surge silo 12.

This embodiment also includes a gypsum feed control mechanism 23 that supplies gypsum from the feed bin 20 to the impact mill 22 at a substantially constant rate. Gypsum feed control mechanism 23 includes a bin discharger 24, such as a rotary-plow type discharger, and a weigh belt 30. The gypsum flows from the bin discharger 24 into and through a chute 26 which allows the gypsum to pass into an input end 28 of a weigh belt 30. In this embodiment, weigh belt 30 includes a variable-speed conveyor belt 32 that is controllable to deliver gypsum at a set rate (e.g., in tons per hour) and includes a load cell 34 for sensing the amount of gypsum deposited on the belt. Weigh belt 30 also includes a variable-speed motor 36, which controls the speed at which the conveyor 32 moves. Weigh belt 30 transfers gypsum from the feed bin 20, to the corresponding impact mill 22. Chute 26 typically is able to hold about 200 lbs. to about 300 lbs of gypsum at the input end 28 of weigh belt 30. A preweigh load cell 38 measures the weight of gypsum disposed in chute 26 at input end 28. The measurements made by load cells 34 and 38 can be used to control the rate of operation of bin discharger 24 in order to keep a constant supply of gypsum disposed in chute 26. The rate at which gypsum is transferred from chute 26 to weigh belt 30 can also be controlled by a screed plate (not shown) which controls the height of the gypsum moved out of chute 26 by weigh belt 30.

In this embodiment, impact mill 22 includes a heat source 90 and a grinding chamber (not shown, but understood to be within impact mill 22). The heat source in this embodiment is a gas/oil fire burner but any type of heat source and any number of heat sources can be used. The gypsum is supplied into impact mill 22 where it is dried, ground and calcined by the heat source and grinding chamber. As known in the art, the grinding chamber has a series of metal hammers attached to a rotating wheel (rotor), where the action of the hammers reduces the particle size of the gypsum to a desired particle size, typically between about 8 microns and about 30 microns. The particle size and distribution is controlled by the number and placement of the hammers on the rotor. In a properly functioning system, the gypsum moves through the impact mill 22 very rapidly because it becomes dried, ground, and calcined in only a few seconds. However, as explained above, the amount of gypsum that can enter into the impact mill and be ground, dried and calcined at any one time is limited by the material composition of gypsum. Specifically, the free water content of most of the gypsum used in the manufacturing process now exceeds 10%. Accordingly, higher temperatures have to be used to remove the free water from the gypsum which results in a reduction in the amount of tonnage of gypsum the mill can process. The reduction of gypsum is due to the fact that the gypsum has to remain in the mill long enough to remove this free water.

The embodiments of the subject invention increase the amount of gypsum that can be processed by the impact mill by removing some of the free water from the gypsum prior to the gypsum entering the impact mill. In the embodiment of FIG. 1, a "gypsum particle optimizer" 50 is positioned in a chute 14 between weigh belt 30 and impact mill 22. While FIG. 1 shows a single gypsum particle optimizer, apparatus 10 can include as many gypsum particle optimizers as there are impact mills. Chute 14 allows gypsum to pass from weigh belt 30 to impact mill 22. While this embodiment shows chute 14 leading into gypsum particle optimizer 50, gypsum particle optimizer 50 can be connected directly to weigh belt 30 and impact mill 22. In this embodiment, gypsum particle optimizer 50 is connected directly to the impact mill's 22 feed chute 42.

Figure 2:
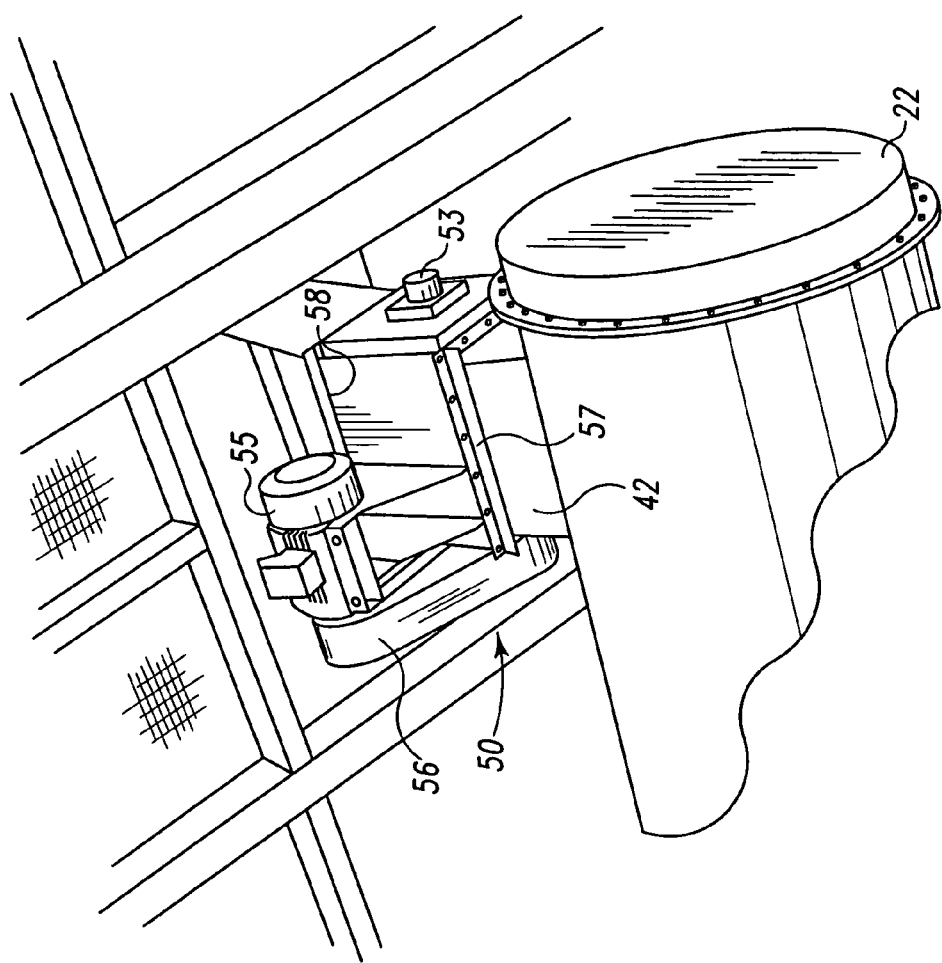
FIG. 2 shows a perspective view of an exemplary embodiment of a gypsum particle optimizer and of an impact mill utilized in the apparatus of FIG. 1.
Figure 3:
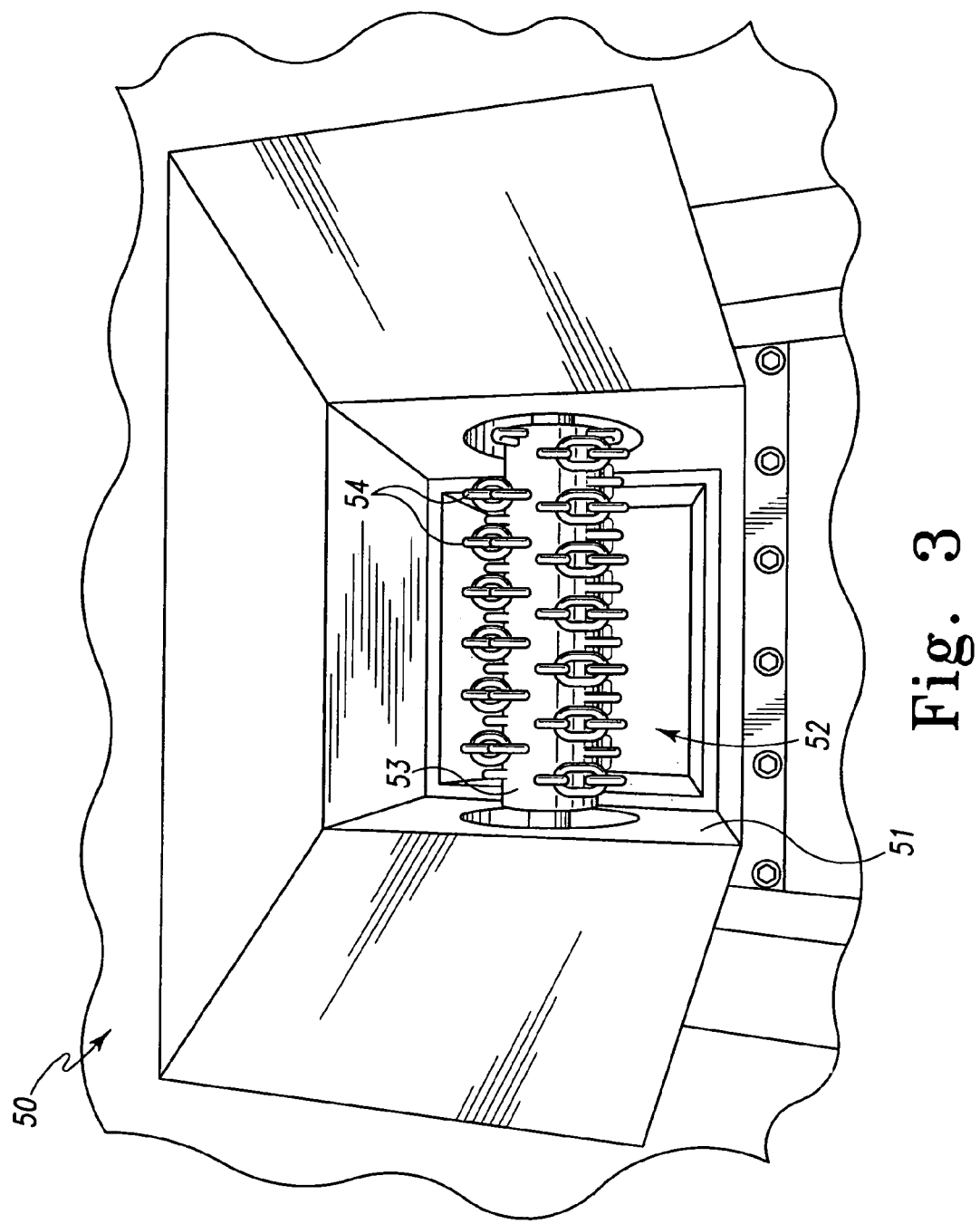
FIG. 3 shows a top view looking into the gypsum particle optimizer of FIG. 2.

FIG. 2 shows a perspective view of gypsum particle optimizer 50 connected to impact mill 22 and FIG. 3 shows a top view looking into gypsum particle optimizer 50. As shown in FIGS. 1-3, gypsum particle optimizer 50 comprises a compartment 51 with two open ends 57 and 58. One open end 57 leads into impact mill's 22 feed chute 42 and the other open end 58 is positioned opposite end 57 and allows gypsum to enter gypsum particle optimizer 50 from chute 14. Open ends 57 and 58 do not have to be positioned opposite one another. Rather, open ends 57 and 58 can be positioned in any manner to create a passageway 52 in between the open ends. Passageway 52 leads the gypsum into impact mill 22. Passageway 52 also allows heat to be transferred from the impact mill into the gypsum particle optimizer 50. Referring to FIG. 3, a rotor 53 is positioned in the middle of passageway 52 so that it can spin. In this embodiment the rotor has chains 54 swinging freely from the rotor. The chains 54 are attached in this embodiment by welding one end of the chain to the rotor. The end opposite of the end welded to the rotor 53 is unattached. As rotor 53 spins, chains 54 will swing freely throughout passageway 52. Referring to FIG. 2, gypsum particle optimizer 50 has a motor 55 that is operably connected to rotor 53 by belt 56. During operation, motor 55 will cause rotor 53 to rotate at any desired speed, typically about 1,200 rpm to 1,800 rpm.

As gypsum enters into gypsum particle optimizer, the gypsum will strike the spinning rotor 53 and chains 54 causing the gypsum to disperse throughout passageway 52. By being dispersed throughout passageway 52, the gypsum will be exposed to the heat from the impact mill 22 that is entering into gypsum particle optimizer 50 from open end 57. The exposure to the heat in this manner causes the gypsum to dry in order to remove some of the free water that is in the gypsum prior to the gypsum entering into the impact mill. As a result, less heat is needed in the impact mill 22 to remove the free water and the total tonnage of material being processed by the impact mill can be increased at least 10%-15%.

Additionally, by passing the gypsum through gypsum particle optimizer 50, the rotation of rotor 53 and chains 54 slings the gypsum down feed chute 42 which helps keep the gypsum from building up in feed chute 42. Thus, the sling effect created by rotor 53 keeps feed chute 42 clear and increases the amount of air flow into impact mill 22. As a result, impact mill 22 is allowed to operate at its optimal design parameters and the consistency of the stucco produced is improved. By passing the gypsum through gypsum particle optimizer 50, the down time associated with the old method of producing stucco is eliminated and the production of wallboard is increased even more due to the increased speed of the mill process. This has resulted in an estimated increase of 50 million square feet of wallboard being produced a year.

A main circulating fan 60 located upstream of impact mill 22 creates an air flow that carries the dried, ground and calcined gypsum 62 out of the grinding chamber in direction of arrow 64. The calcined gypsum then enters a classifier unit 66 with a series of classifying veins (not shown) that separate larger particles from those falling within the desired particle size range. The larger particles are returned to the impact mill 22 through a return pipe 68 (traveling in direction of arrow 69). The larger particles are further processed with the gypsum supplied by weigh belt 30 in order for the larger particles to be reduced to the desired size. The air flow caused by fan 60 transports the calcined gypsum particles of the desired size out of classifier unit 66 in the direction of arrow 70 and causes the calcined gypsum to enter into a cyclone collector 72. Cyclone collector 72 separates out the majority of the calcined gypsum product 74 (typically about 95%) from the air flow and deposits the calcined gypsum 74 in a product conveyer 76, which can be a screw conveyor or any other conveyor known in the art. At the upper end 78 of cyclone collector 72, hot air, moisture from calcination and ultra fine particles 80 of calcined gypsum are discharged in the direction indicated by arrow 82 and are caused to move into a dust collector unit 84 by the air flow produced by fan 60. Dust collector 84 separates out particles 80 from the air stream and causes the particles to be deposited on the product conveyor 76. The majority of the resulting clean air is then exhausted to the atmosphere at a vent 86, while a portion of the clean air is returned to the burner of impact mill 22, via air return line 88.

A vent temperature sensor (not shown) measures the temperature of the air exhausted at the vent 86. Maintaining a consistent vent temperature is desirable in operating impact mill 22, because a consistent vent temperature generally indicates a consistent degree of calcination of the gypsum. A target value for the vent temperature is selected so that the calcined gypsum produced by the impact mill is of a high quality stucco (i.e., the required amount of water is driven off to completely convert the gypsum to stucco), and the amount of uncalcined and anhydrous gypsum mixed with the stucco is minimized. The higher the vent temperature the more moisture is removed from the gypsum which results in a stucco with a lower moisture content.

Typically, the stucco has a theoretical water content of less than 6.2%. The vent temperature can be set to obtain stucco with water content below this percentage, but one has to be careful because producing stucco with too low of a moisture content will result in an increased amount of soluble anhydrite mixed with the stucco. During operation of the impact mill 22, the stucco product 74, 80 is sampled at regular intervals (e.g., every 2 hours) and its moisture content is analyzed. The vent temperature is adjusted, as necessary, to insure that the product contains the desired moisture content. The target vent temperature is normally set to a value between about 149° C. and about 168° C., more preferably between about 154° C. and about 160° C. In order to maintain the vent temperature as close as possible to the target temperature, the inlet temperature of air being drawn into impact mill 22 is changed by adjusting the rate at which the burner of impact mill 22 operates.

To control the operation of the equipment in the continuous calcinations apparatus 10, a programmable logic control (PLC) computer can be used. Numerous PLCs are known in the art and can be used to control the equipment in apparatus 10. The PLC can be programmed, according to methods known to those skilled in the art, to coordinate and control the operation of the silo discharger 18, all the conveyors 16, 19 and 76, the bin discharger 24, gypsum particle optimizer 50, and the weigh belt 30. However, weigh belt 30 includes a separate programmable controller for controlling the rate at which gypsum is supplied to impact mill 22. The PLC can also be programmed to control the operation of impact mill 22, including regulating the burner operation to maintain the vent temperature as close as possible to the target vent temperature. The PLC can also be programmed to control the classifier 66, fan 60, and dust collector 84.

While the subject invention has been described in detail with reference to certain exemplary embodiments thereof, such are offered by way of a non-limiting example of the invention, as other versions are possible. For example, it will be appreciated by those skilled in the art that other means aside from a rotor with chains can be used to disperse the gypsum throughout the passageway of the gypsum particle optimizer. It is anticipated that a variety of other modifications and changes will be apparent to those having ordinary skill in the art and that such modifications and changes are intended to be encompassed within the spirit and scope of the invention as defined by the following claims.

I claim:

1. A method for calcining gypsum, the method comprising the steps of:
   providing at least one impact mill that has at least one heat source that produces heat;
   providing at least one gypsum particle optimizer with a rotor, the gypsum particle optimizer being positioned in close association with the impact mill so that any gypsum supplied to the impact mill has to enter into the gypsum particle optimizer prior to entering into the impact mill and so that heat produced from the heat source will enter into the gypsum particle optimizer;
   supplying gypsum to the gypsum particle optimizer; and
   rotating the rotor as the gypsum enters into the gypsum particle optimizer, so that the gypsum is exposed to the heat produced by the heat source prior to the gypsum entering the impact mill.

2. The method of claim 1 further comprising the step of connecting at least one chain to the rotor so that the at least one chain will have one end that swings freely as the rotor rotates.

3. The method of claim 1 wherein the gypsum particle optimizer has a motor operably connected to the rotor.

4. The method of claim 1 wherein the rotor is rotated at a rate of about 1200 rpm to about 1800 rpm.

5. The method of claim 1, wherein the gypsum particle optimizer is connected directly to a feed chute that leads into the impact mill.

6. The method of claim 1 further comprising the step of supplying the gypsum to the gypsum particle optimizer at a substantially constant rate.

7. An apparatus for calcining gypsum comprising:
   at least one impact mill having a feed chute leading into the impact mill and at least one heat source that produces heat; and
   a gypsum particle optimizer attached to the feed chute of the impact mill so that heat produced by the heat source will enter into the gypsum particle optimizer from the impact mill and so that any gypsum supplied to the apparatus will pass through the gypsum particle optimizer and be exposed to the heat prior to entering into the impact mill,
      wherein the gypsum particle optimizer has a compartment that forms a passageway for the gypsum and the passageway has a rotor positioned therein in a manner that allows the rotor to rotate.

8. The apparatus of claim 7 wherein the gypsum particle optimizer further has a motor operably connected to the rotor so that in operation the motor will rotate the rotor.

9. The apparatus of claim 8 wherein the rotor of the gypsum particle optimizer has at least one chain connected to the rotor so that one end of the chain will swing freely as the rotor rotates.

10. The apparatus of claim 7 further comprising a weigh belt that substantially supplies gypsum to the gypsum particle optimizer at a substantially constant rate.

* * * * *